United States Patent
Tanaka et al.

[11] Patent Number: 5,966,253
[45] Date of Patent: Oct. 12, 1999

[54] TRANSMISSION TYPE OPTICAL DEFLECTOR

[75] Inventors: Akihiro Tanaka, Kanagawa; Masataka Nishiyama, Saitama, both of Japan

[73] Assignee: Asahi Kogaku Kogyo Kabushiki Kaisha, Tokyo, Japan

[21] Appl. No.: 09/097,654

[22] Filed: Jun. 16, 1998

[30] Foreign Application Priority Data

Jun. 17, 1997 [JP] Japan .................................... 9-159932

[51] Int. Cl.$^6$ .............................. G02B 5/04; G02B 26/08
[52] U.S. Cl. ........................... 359/837; 359/211; 359/831
[58] Field of Search .................................. 359/211, 831, 359/834, 835, 837

[56] References Cited

U.S. PATENT DOCUMENTS

| | | | |
|---|---|---|---|
| 3,572,887 | 3/1971 | Leitzsch | 359/835 |
| 4,118,109 | 10/1978 | Crawford et al. | 359/211 |
| 4,878,720 | 11/1989 | Hanke et al. | 359/211 |
| 4,960,313 | 10/1990 | Yamanaka | 359/211 |
| 5,247,508 | 9/1993 | Tanaka | 369/112 |
| 5,249,173 | 9/1993 | Tanaka | 369/119 |
| 5,559,639 | 9/1996 | Nakagishi et al. | 359/823 |
| 5,760,944 | 6/1998 | Minakuchi et al. | 359/211 |

*Primary Examiner*—Cassandra Spyrou
*Assistant Examiner*—Jennifer Winstedt
*Attorney, Agent, or Firm*—Greenblum & Bernstein, P.L.C.

[57] ABSTRACT

A transmission type optical deflector wherein a prism holder is supported by a yoke member to rotate about a principal axis through an elastic device. A wedge-shaped transmission prism is provided on the prism holder to transmit and refract light. The prism holder and yoke member are respectively provided with a coil and a permanent magnet secured thereto, to produce a rotational motion of the prism holder in the forward and reverse directions about the principal axis due to an electromagnetic function. The transmission prism is partly cut away at the thick portion thereof so that the center of gravity of the transmission prism is identical to the principal axis in a section in which the principal axis appears as a point and the transmission prism appears as a wedge-shape.

7 Claims, 8 Drawing Sheets

TRANSMISSION TYPE OPTICAL DEFLECTOR

BACKGROUND OF THE INVENTION

1. Field of the Invention

The present invention relates to an optical transmission deflector in which light is deflected by a prism which is mechanically driven via electromagnetic operation.

2. Description of the Related Art

There are two types of optical deflectors known in which a mirror which is adapted to deflect light is reciprocally moved or the mirror is rotated. The use of a galvano mirror is one typical way of providing an optical deflector, wherein the mirror is reciprocally moved. The use of a polygonal mirror is another way of providing an optical deflector, wherein the mirror is rotated. However, there is no transmission type optical deflector known hitherto. In theory, a transmission deflector can be realized, for example, by the employment of a wedge-shaped prism in place of the galvano mirror. However, no transmission deflector has been actually practiced. This is because, firstly, a wedge-shaped prism is heavier than a planar mirror, and secondly, the position of the center of gravity of the prism varies depending on the shape thereof, and hence oscillation tends to occur due to a weight imbalance, thus leading to difficulty in realizing a precise and fast-driven optical deflector.

SUMMARY OF THE INVENTION

It is an object of the present invention to provide a transmission type optical deflector that uses a prism, which can be driven fast and precisely.

To achieve the object mentioned above, according to an aspect of the present invention, there is provided a transmission type optical deflector, wherein a prism holder is supported by a yoke member to rotate about a principal axis through an elastic member; and a wedge-shaped transmission prism is provided on the prism holder to transmit and refract light. The prism holder and yoke member are provided with a coil and a permanent magnet secured thereto, respectively, to produce a rotational motion of the prism holder in the forward and reverse directions about the principal axis due to an electromagnetic function. The transmission prism is partly cut away at the thicker portion thereof so that the center of gravity of the transmission prism is identical to the principal axis in a section in which the principal axis appears as a point and the transmission prism appears as a wedge-shape.

With the arrangement in which the center of rotation of the prism holder, i.e., the principal axis of the elastic member, is identical to the center of gravity of the transmission prism supported by the prism holder, the prism holder can be precisely driven at high speed by the drive force of the m a gnetic drive circuit.

Preferably, the prism holder is cylindrical in a front elevational view, and the transmission prism supported by the cylindrical portion of the prism holder is non-circular in a front elevational view in which a part of a circular shape of the prism is cut away.

The prism holder can be provi ded with a pair of independent c oils secured thereto, which are placed on opposite sides of a plane including the principal axis and perpendicular to the center axis of the coils. The yoke member can be provided with front and rear permanent magnets secured thereto, each having a pair of split segments corresponding to a pair of the coils. The permanent magnets are placed on opposite sides of the plane including the principal axis and perpendicular to the center axis of the coils. The polarities of the permanent magnet segments are opposite, so that when the prism holder is driven, electric current flows through the coils in opposite directions. Consequently, a large electromagnetic force can be obtained by the small electromagnetic drive device.

According to another aspect of the present invention, there is provided a transmission type optical deflector, constituting: a yoke member; a prism holder that is supported by the yoke member to rotate about a principal axis via an elastic member; a wedge-shaped transmission prism that is provided in the prism holder to transmit and refract light, the transmission prism being partly cut away at the thick portion thereof so that the center of gravity of the transmission prism is identical to the principal axis in a section in which the principal axis appears as a point; and a coil and a permanent magnet provided with the prism holder and yoke member respectively to produce a rotational motion of the prism holder in the forward and reverse directions about the principal axis via an electromagnetic function. Preferably, the transmission prism supported by said prism holder is non-circular in a front elevational view in which a part of a circular shape of the prism is cut away. Preferably, the prism holder also provides a pair of independent coils secured thereto, which are placed on opposite sides of a plane including the principal axis and perpendicular to the center axis of the coils. Preferably, the yoke member is provided with front and rear permanent magnets secured thereto, each having a pair of split segments corresponding to a pair of coils, the permanent magnets being placed on opposite sides of the plane including the principal axis and perpendicular to the center axis of the coils. The polarities of the permanent magnet segments are opposite, so that when the prism holder is driven, electric current passes through the pair of coils in opposite directions.

The present disclosure relates to subject matter contained in Japanese Patent Application No. 09-159932 (filed on Jun. 17, 1997) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
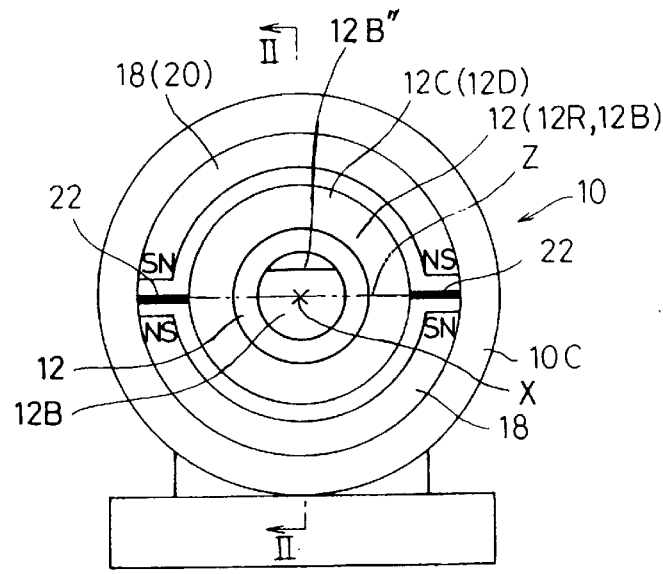
FIG. 1 is a front elevational view of a transmission type optical deflector according to an embodiment of the present invention.
Figure 2:
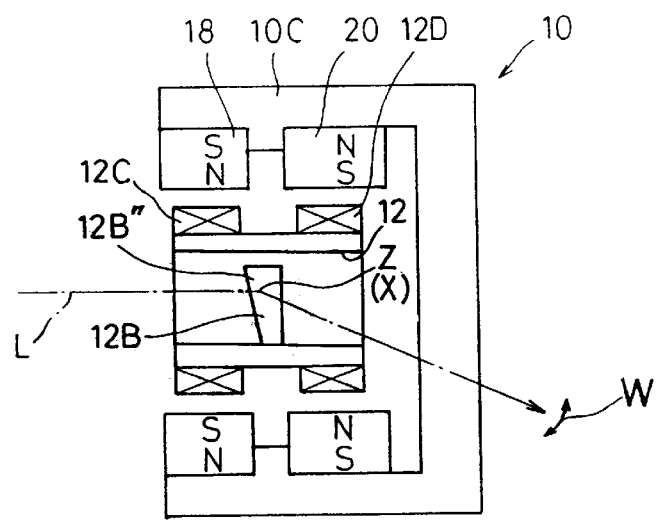
FIG. 2 is a sectional view taken along the line II—II in FIG. 1.
Figure 3:
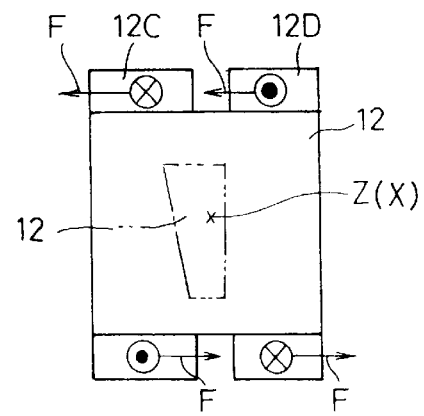
FIG. 3 is a sectional view similar to FIG. 2 having a pair of coils, with the body removed.

FIGS. 1 through 3 show a basic structure of a transmission deflector, which is electromagnetically driven, according to the present embodiment. A yoke member (base member) 10, made of a magnetic material, is provided with a cylindrical portion 10C in which a prism holder 12 having a prism 12B as a deflector member.

The prism holder 12 is elastically supported to rotate about a principal axis z (Z-axis) through an elastic member 22 which connects the cylindrical portion 10C and the prism holder 12. The elastic member 22 is simply indicated by a thick solid line in the drawings. However, the elastic member is not limited to any specific shape, so long as it can elastically support the prism holder 12 to rotate about the Z-axis.

Figure 4:
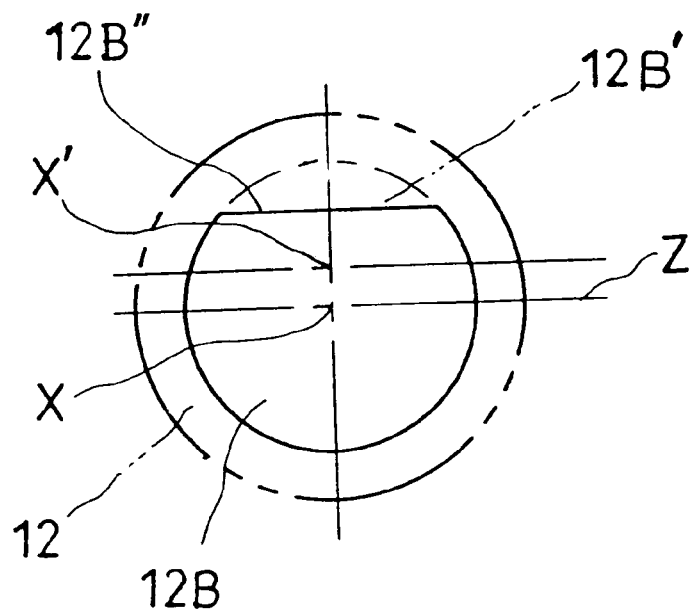
FIG. 4 is a front elevational view of a prism shown in FIG. 1.
Figure 5:
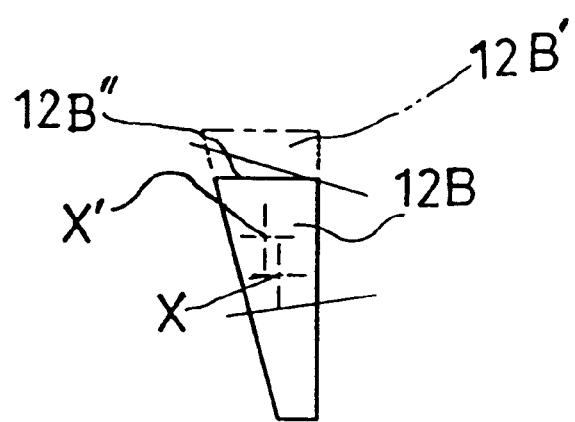
FIG. 5 is a side elevational view of FIG. 4.

The prism 12B supported by the cylindrical prism holder 12 is non-circular as viewed in FIG. 1. Namely, the prism 12B is obtained by cutting away an upper part of the circular prism 12B' whose thickness increases toward the upper end, along a cutting line 12B", as shown in FIGS. 4 and 5. Consequently, the center of gravity of the wedgeshaped (sectional shape) prism 12B is shifted to a position X which is located lower than the center of gravity X' of a perfectly circular prism 12B' as viewed in FIG. 4. The cutting line 12B" is determined such that the center of gravity X is identical to the principal axis Z. Namely, the principal axis Z extends in the lateral direction (right left direction) of the non-circular prism 12B as viewed in FIG. 1 and the center of gravity X of the prism 12B is located on the principal axis Z (FIG. 4). The center of gravity X is identical to the principal axis Z in a sectional plane in which the principal axis Z appears as a point and the prism 12B appears as a wedge-shape. The cutting line 12B" of the prism 12B extends in parallel with the principal axis Z.

The prism holder 12 is provided on the outer peripheral surface thereof with a pair of independent coils 12C and 12D secured thereto. The identical coils 12C and 12D are symmetrically arranged on opposite sides of a plane perpendicular to the center axis of the coils and including the Z-axis.

The yoke member 10 is provided, on the inner surface of the cylindrical portion 10C thereof, with a pair of split permanent magnets (front and rear permanent magnets) 18 and 20 secured thereto, each consisting of a pair of semicircular (semi-annular) magnet segments. The front and rear permanent magnets 18 and 20 are arranged on opposite sides of a plane perpendicular to the center axis of the coils and including the Z-axis, corresponding to the coils 12C and 12D. A pair of permanent magnet segments 18 have opposite polarities. Likewise, a pair of permanent magnet segments 20 have opposite polarities. Namely, one of the magnet segments 18 or 20 has a south polarity (S-pole) at the inner peripheral side and has a north polarity (N-pole) at the outer peripheral side. The other magnet segment 18 or 20 has a north polarity (N-pole) at the inner peripheral side and a south polarity (S-pole) at the outer peripheral side. Also, the polarities of the front and rear permanent magnet 18 and 20 that are located on opposite sides of the plane perpendicular to the center axis of the coils 12C and 12D and including the Z-axis are opposite to each other.

With the polarity distribution of the permanent magnets as mentioned above, in order to rotate the prism holder 12 in the forward or reverse direction about the Z-axis, electric current is given to the coils 12C and 12D in opposite directions. FIG. 3 shows an example of the directions of the electric current passing in the coils 12C and 12D and the rotational force F produced in the prism holder 12 when the polarities of the permanent magnets 18 and 20 are as shown in FIG. 2. If the current passes in the coils 12C and 12D in a direction opposite to that shown in FIG. 3, the direction of the rotational force F produced in the prism holder 12 is opposite to that shown in FIG. 3. Owing to the rotational force F, the prism holder 12 is rotated about the principal axis Z, so that the light L incident upon and refracted by the prism 12B is deflected thereby in accordance with the rotational angle of the prism holder 12, as indicated by an arrow W in FIG. 2. Since the center of gravity X of the prism 12B is located on the principal axis Z, there is no energy loss produced by the rotation of the prism holder 12. moreover, there is no weight imbalance with respect to the center of rotation, and hence no oscillation due to the weight imbalance occurs. Consequently, the prism holder can be precisely driven at high speed.

In addition to the foregoing, if the electric current passes through the coils 12C and 12D in opposite directions, as in the illustrated embodiment, the mutual inductance of the coils can be reduced. Furthermore, since the polarities of the permanent magnets 18 and 20 are opposite, so that when the electric current flows in the coils 12C and 12D in opposite directions, the rotational force in the same direction is produced in the prism holder 12, the magnetic circuit constituted by the permanent magnets 18 and 20 and the yoke member 10 tends not to be saturated. Consequently, it is possible to make the yoke member 10 (cylindrical portion 10C) thinner.

A more detailed embodiment of the present invention will be discussed below with reference to FIGS. 6 through 11.

The base member 10 is composed of a bed 10A and an upright frame portion 10B integral with the bed 10A. The base member 10 functions as a mount which can be used when it is incorporated in an optical system. The frame member 10B is an annular member which defines a circular opening 10C. The prism holder 12 which is in the form of a short cylinder is disposed within the circular opening 10C of the annular frame member 10B (i.e., within the cylindrical portion) and is supported by the frame portion 10B through the elastic member 22.

A substantially rectangular cover 14 can be attached to the front end of the base member 10. The cover 14 is provided with a circular opening 14A at the center portion thereof. A permanent magnet holder 16 can be attached to the rear end of the base member 10. The holder 16 is composed of a holder body 16A in the form of a short cylinder and a pair of mount plates 16B which extend in the radial direction from the holder body 16A. A pair of split permanent magnet segments 18 and 20 which are provided on opposite sides of a plane including the axis Z and perpendicular to the center axis of the coils 12C and 12D are disposed in the holder body 16A. The polarity distribution of the permanent magnets 18 and 20 is the same as that shown in FIG. 2. Note that in FIG. 6, only one of the permanent magnet segments 20 is shown.

The mount plates 16B are adapted to mount the magnet holder 16 to the frame 10B of the base member 10. Upon mounting the magnet holder 16, the holder body 16A is received in the circular opening 10C of the base member 10 to surround the permanent magnets 18 and 20, each consisting of a pair of magnet segments. The cover 14 and the holder 16 are preferably made of the same material as the base member 10.

Figure 7:
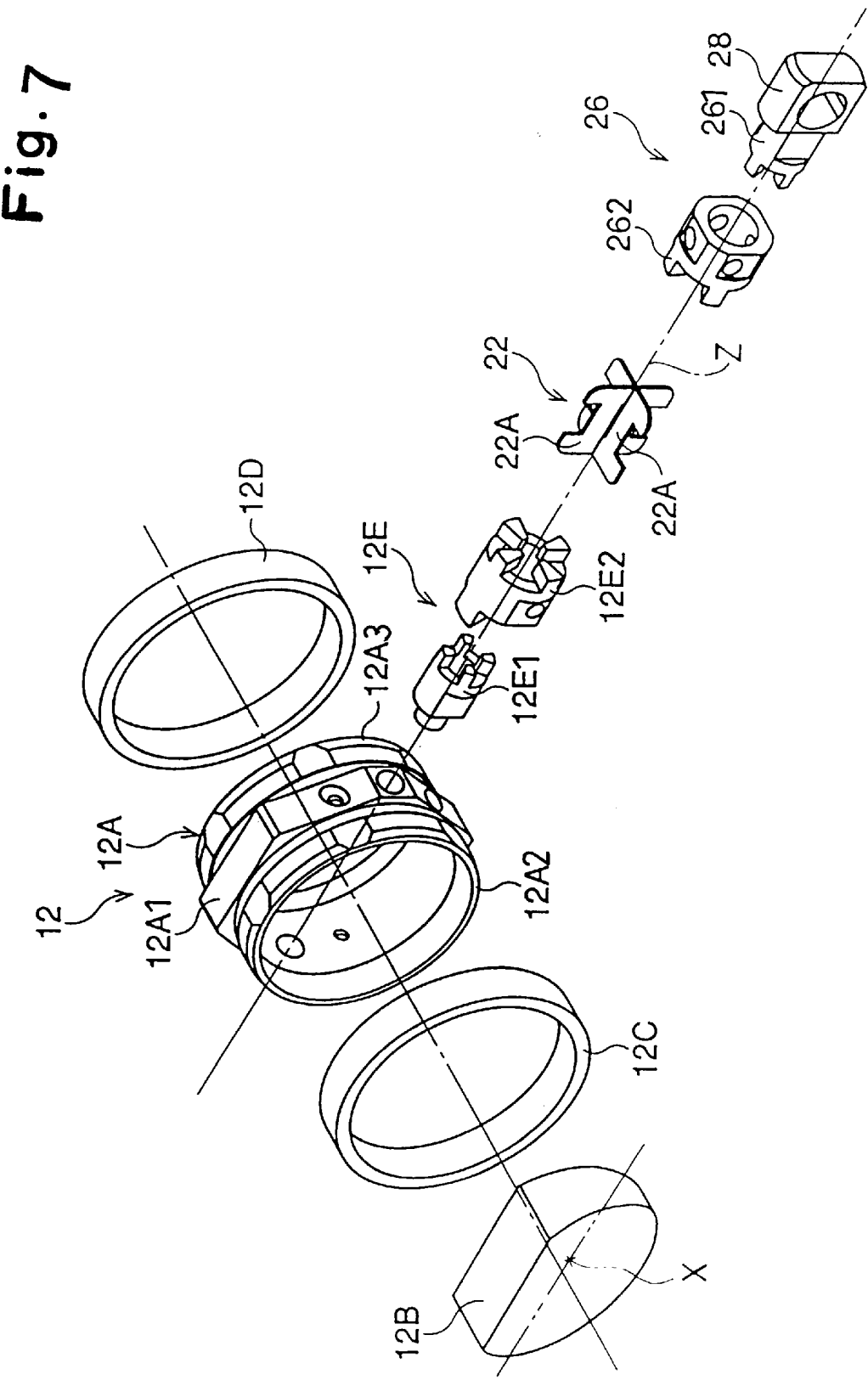
FIG. 7 is an exploded perspective view of prism holders of an apparatus shown in FIG. 6.

In FIG. 7, the prism holder 12 is provided with a deflector holding element 12A in the form of a short cylinder and a prism 12B provided in the holding element 12A.

The holding element 12A is comprised of a center polygonal flange portion $12A_1$ and collars $12A_2$ and $12A_3$ which project from the opposite ends of the center flange portion $12A_1$. The prism holder 12 is also provided with the coils 12C and 12D attached to the collars $12A_2$ and $12A_3$ of the holder member 12A. The coils 12C and 12D in which electric currents can flow independently cooperate with the permanent magnets 18 and 20 and serve as a drive means for driving the prism holder 12. The coils 12C and 12D which are annular in FIG. 7 can be made of conductors wound in the form of a ring. No power supply lead for the coils 12C and 12D is shown in the drawings.

The prism holder 12 is also provided with leaf spring couplings 12E attached to the diametrically opposed sides of the center flange portion $12A_1$ of the deflector holder member 12A. Note that in FIG. 7, only one coupling 12E is shown. The coupling 12E is composed of a securing coupling portion $12E_1$ which is secured to the center flange portion $12A_1$ and a detachable coupling portion $12E_2$ which is detachably attached to the securing coupling portion $12E_1$.

Figure 8:
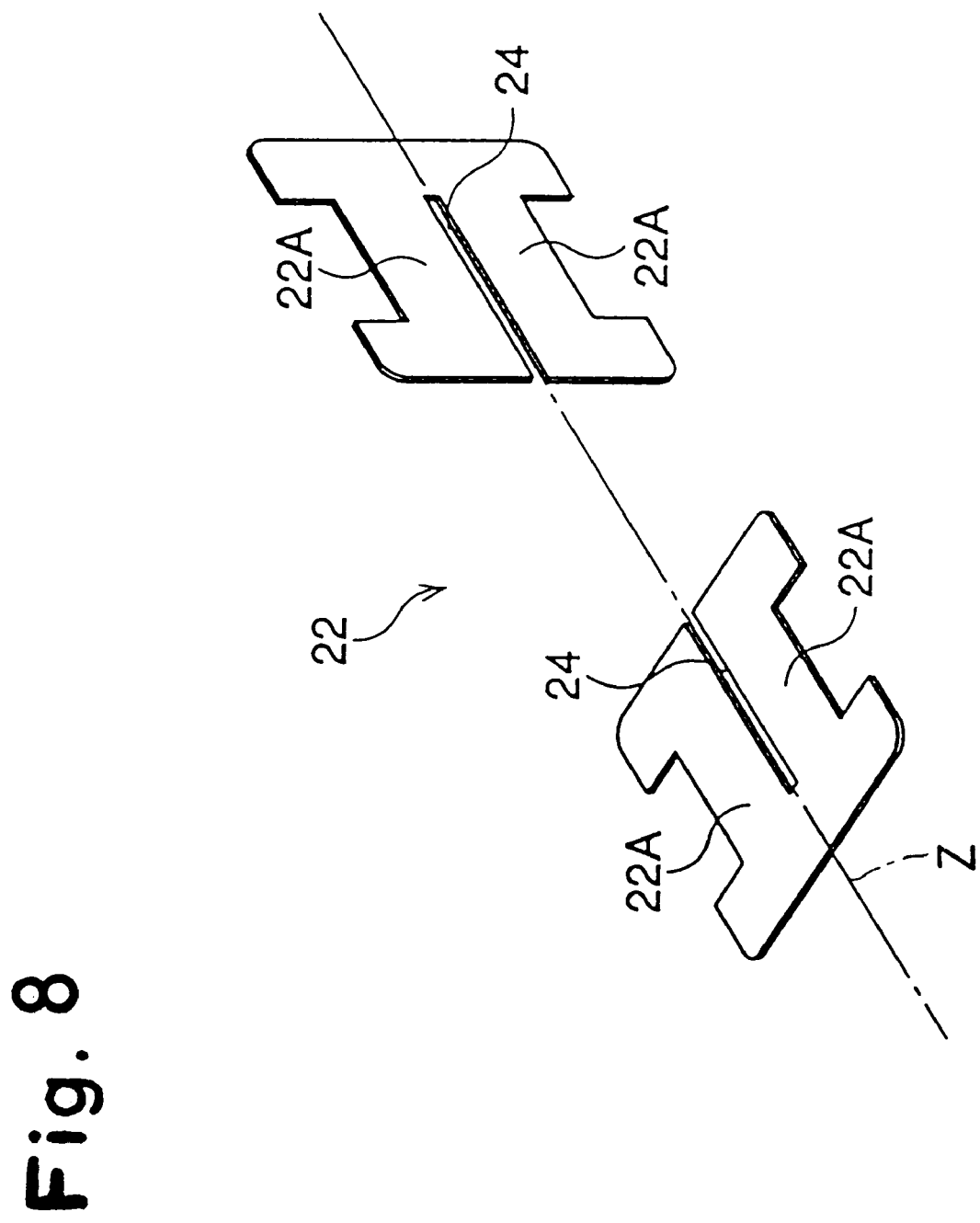
FIG. 8 is an exploded perspective view of a composite leaf spring body (elastic member) which supports prism holders shown in FIG. 7.

The composite leaf spring body (elastic member) 22 is connected to each coupling 12E. The composite leaf spring body 22 is composed of four leaf spring elements 22A in the illustrated embodiment. As can be seen in FIG. 8, a generally H-shaped plate is provided with a slit 24 which splits the plate into two identical halves which are interconnected at their one end, so that a pair of leaf spring elements 22A are formed. Two of the generally H-shaped plates are assembled in such a way that the plates lie in orthogonal planes and the slits are inserted into one another. Consequently, the composite leaf spring body (elastic member) 22 as shown in FIG. 7 in which the four leaf spring elements 22A are spaced at an equi-angular distance of 90 degrees about the longitudinal axis of the slits 24 can be obtained.

As can be seen in FIG. 7, a second leaf spring coupling 26 is provided on the end of the first leaf spring coupling 12E away from the prism holder 12. The second leaf spring coupling 26 is composed of a securing coupling portion $26_1$ which is secured to the frame portion 10B of the base member 10 and a detachable coupling portion 262 which is detachably attached to the securing coupling portion $26_1$. The second leaf spring coupling 26 is substantially the same as the first leaf spring coupling 12E except that the securing coupling portion $26_1$ is integrally connected to a mounting block piece 28 having a through hole.

Figure 9:
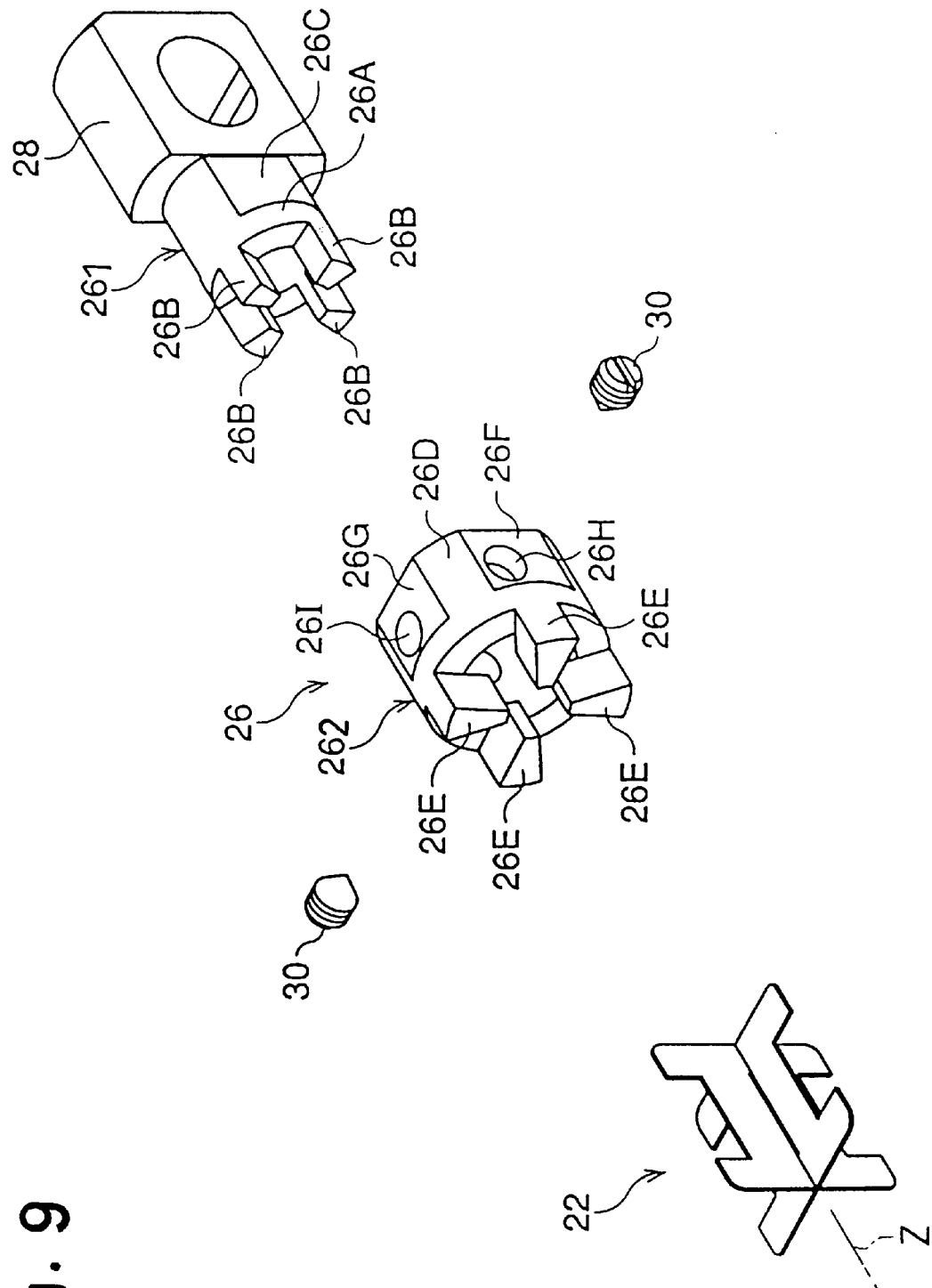
FIG. 9 is an exploded perspective view of a coupling for connecting a composite leaf spring body shown in FIG. 8.

As shown in FIG. 9, the securing coupling portion $26_1$ is made of a short tubular shaft 26A which protrudes from the mounting block piece 28 and which is provided with four projections 26B projecting from the free end of the tubular shaft 26A. The four projections 26B are circumferentially spaced from one another at an equi-angular distance of 90 degrees about the center axis of the tubular shaft 26A. Each of the projections 26B has a segmental cross sectional shape, as can be seen in FIG. 9. The shaft portion 26A is provided on the peripheral surface thereof with a pair of flat surface portions 26c which are diametrically opposed. Note that only one flat surface portion 26C is shown in FIG. 9.

The detachable coupling portion 262 is in the form of a short tubular shaft 26D whose diameter is larger than that of the tubular shaft 26A, so that the shaft portion 26D can be loosely fitted in the shaft portion 26D. The shaft portion 26D is provided with four projections 26E projecting from the one end of the tubular shaft 26D. The four projections 26E are circumferentially spaced from one another at an equi-angular distance of 90 degrees about the center axis of the tubular shaft 26D. Each of the projections 26E has a segmental cross sectional shape, as can be seen in FIG. 9. The shaft portion 26D is provided on the peripheral surface thereof with two pairs of flat surface portions 26F and 26G which are diametrically opposed. Note that only one flat surface portion 26F and only one flat surface portion 26G are shown in FIG. 9.

Figure 10:
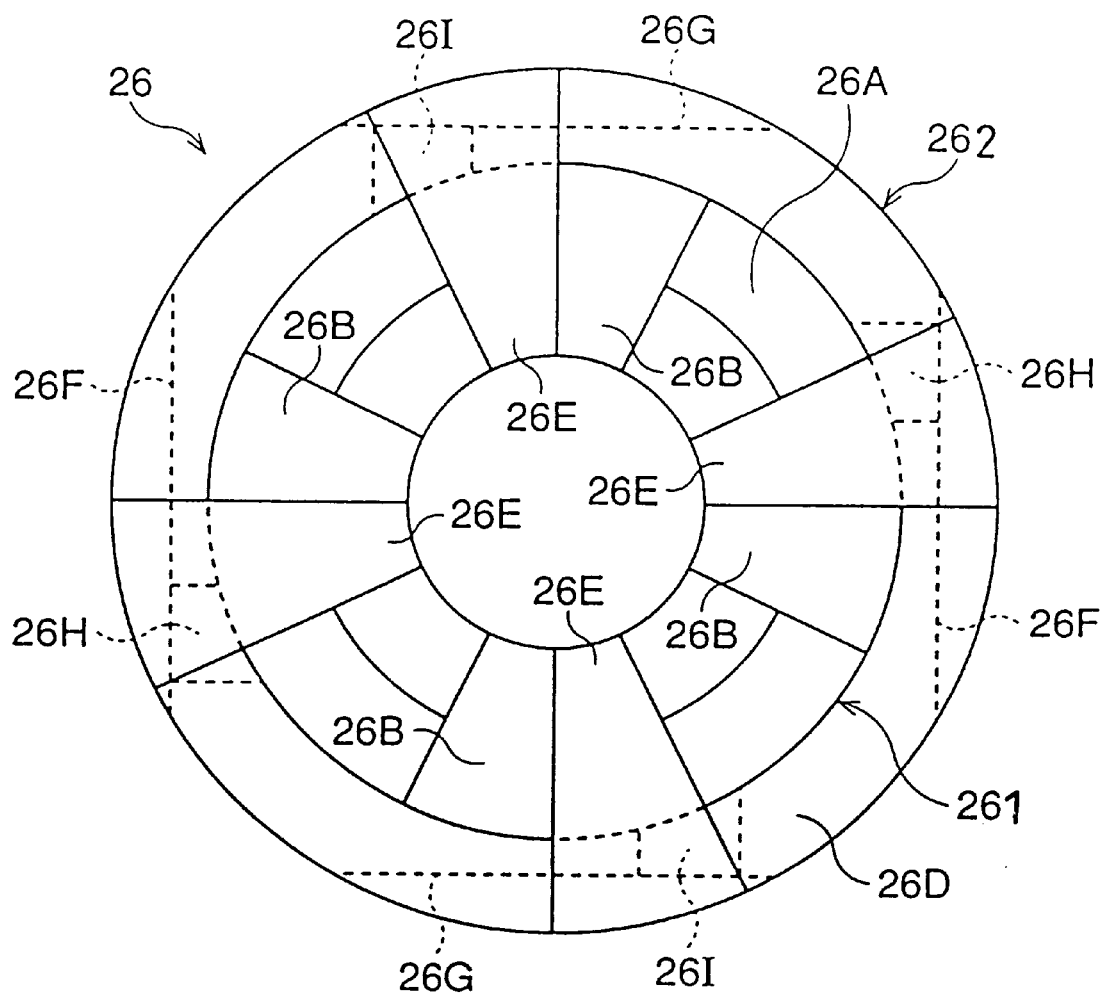
FIG. 10 is an end view of a coupling for a leaf spring, shown in FIG. 9.
Figure 11:
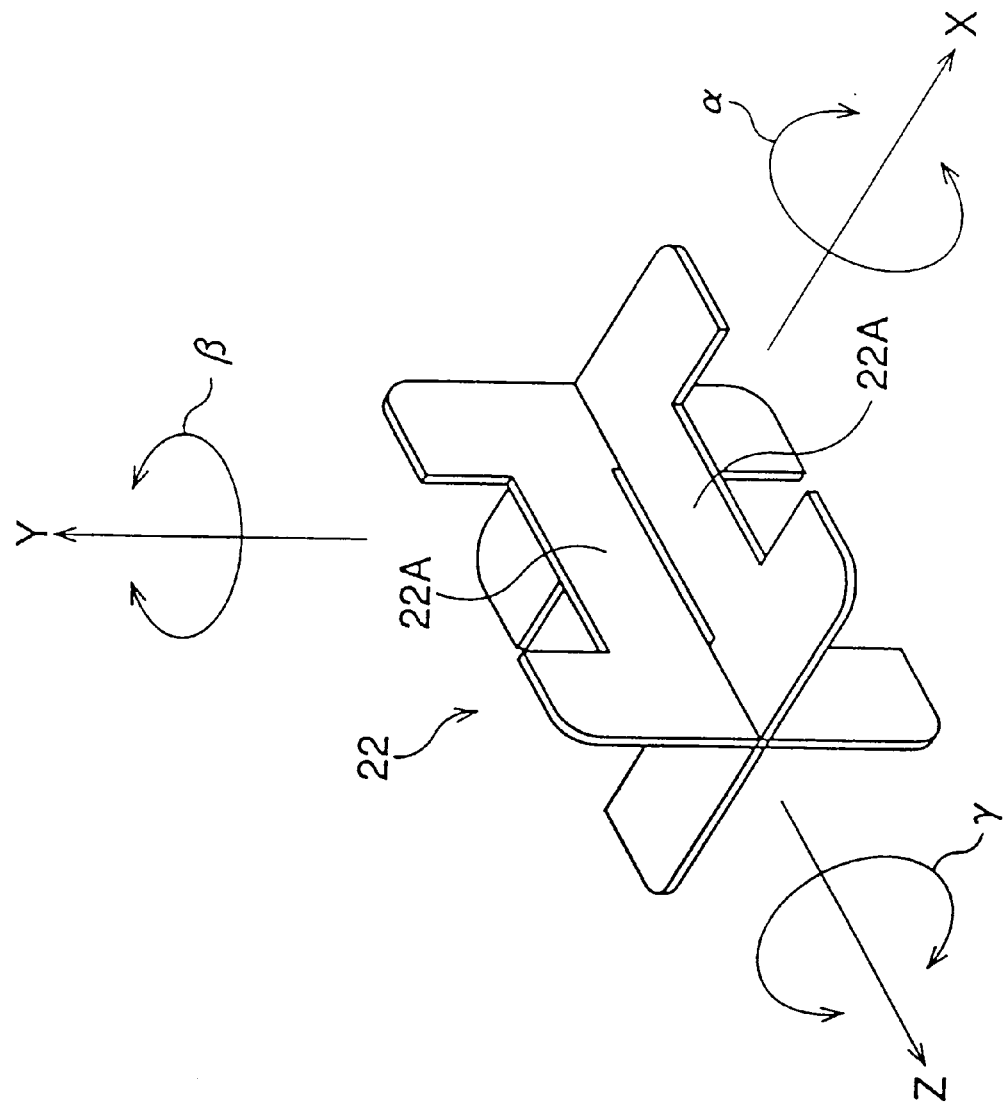
FIG. 11 is an explanatory perspective view of a composite leaf spring body shown in FIG. 8, in an assembled state.

As may be seen in FIG. 10, the flat surfaces 26F and 26G are respectively provided with threaded holes 26H and 26I. Each pair of threaded holes 26H or 26I are deviated in opposite directions with respect to the longitudinal center axis of the shaft portion 26D. Namely, in an embodiment illustrated in FIGS. 9 and 10, the threaded hole 26H formed in the flat surface 26F appearing in FIG. 9 is deviated in the counterclockwise direction as viewed from the side of the four projections 26E of the shaft portion 26D. Likewise, the threaded hole 26H formed in the other flat surface 26F diametrically opposed to the first-mentioned flat surface 26F is deviated also in the counterclockwise direction. The same is true for the pair of threaded holes 26I formed in the pair of flat surfaces 26G.

Consequently, when a pair of screws 30 (FIG. 9) are screwed in the corresponding threaded holes 26H after the detachable coupling portion $26_2$ is connected to the securing coupling portion $26_1$ by engaging the projection 26B with the projections 26E as shown in FIG. 10, the front end of the screws 30 abut against the flat surface portions 26C of the securing coupling portion $26_1$. Further fastening of the screws 30 gives a rotation force to the securing coupling portion $26_1$ and the detachable coupling portion $26_2$ in opposite directions, so that the engaging surfaces of the adjacent projections 26B and 26E are pressed against each other. If the above-mentioned fastening operation of the pair of screws 30 is carried out while the ends of the spring elements 22A of the composite leaf spring body 22 are held between the adjacent projections 26B and 26E, the composite leaf spring body 22 is secured to the leaf spring coupling 26.

As mentioned above, the structure of the leaf spring coupling 26 is the same as that of the leaf spring coupling 12E and hence the composite leaf spring body 22 is secured to the leaf spring coupling 12E in the similar way as the leaf spring coupling 26.

Figure 6:
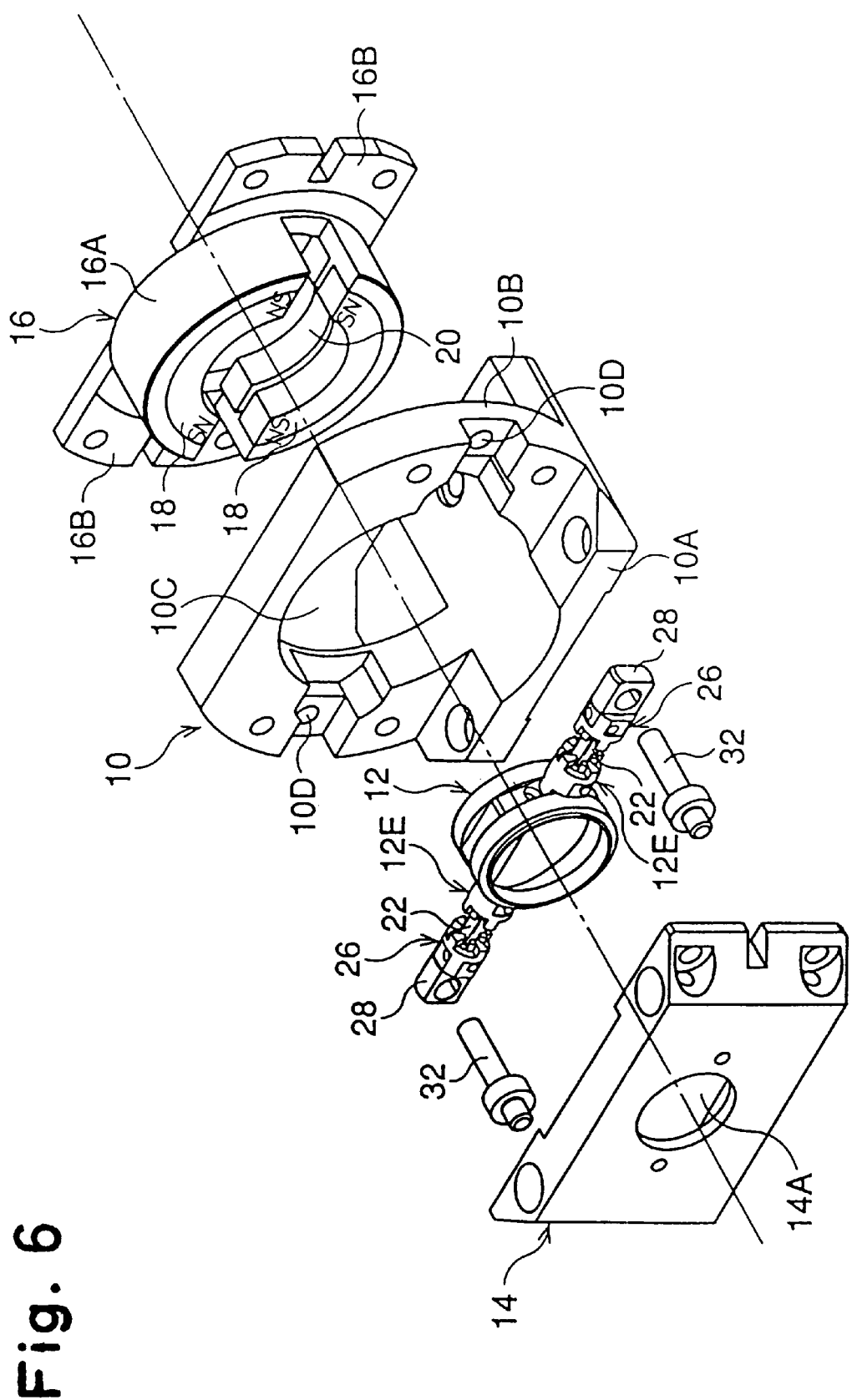
FIG. 6 is an exploded perspective view of an electromagnetic drive apparatus in an optical deflector according to the present invention.

The assembly of the prism holder 12 is shown in FIG. 6, in which the composite leaf spring bodies 22 are secured at their one end to the pair of leaf spring couplings 12E and are secured at the other ends to the pair of leaf spring couplings 26. Bolts 32 are inserted in the through holes of the mounting block pieces 28 of the securing coupling portions $26_2$ of the leaf spring couplings 26 and are screwed in diametrically opposed threaded holes 10D of the frame 10B of the base member 10. As may be understood from FIG. 6, the threaded holes 10D are formed in recessed portions formed on the frame portion 10B, so that when the mounting block pieces 28 are secured by the bolts 32, the mounting block pieces 28 can be received in the corresponding recessed portions.

Thus, the prism holder 12 is held by the frame portion 10B of the base member 10 through the pair of composite leaf spring bodies 22. In this state, the prism holder 12 can be most easily rotated about the longitudinal center axis of the leaf spring couplings 12E and 26, i.e., the longitudinal center axis of the composite leaf spring bodies 22. Namely, in three-dimensional coordinates shown in FIG. 11, in which the origin is located at the center of the composite leaf spring body 22 and wherein one pair of leaf spring elements 22A lie in an X-Z plane and the other pair of leaf spring elements 22A lie in a Y-z plane, the compliance ($\alpha$) about the X-axis is substantially identical to the compliance ($\beta$) about the Y-axis and is considerably greater than the compliance ($\gamma$) about the Z-axis. In short, with the composite leaf spring body 22, the compliance about the Z-axis is smallest.

If the electric current flows through the coils 12C and 12D of the prism holder 12 within the magnetic field produced by the two pairs of split permanent magnet segments 18 and 20, the prism holder 12 receives a rotational force about the Z-axis in accordance with the right-hand rule. The direction of the rotation depends on the direction of the current flowing in the coils 12C and 12D. Thus, the Z-axis is the axis of rotation of the prism holder 12, i.e., the principal axis.

As may be understood from the foregoing, with the composite leaf spring body 22 constructed as above, the low compliance takes place only about the principal axis (Z-axis) of the prism holder 12, and hence if an external force such as an external oscillation is applied to the optical deflector during the driving of the prism holder 12, the prism holder can stably rotate only about the principal axis (Z-axis).

In particular, since the center of gravity x of the prism 12B (i.e., the center of gravity of the prism holder 12) is located on the principal axis (Z-axis), it is possible to effectively prevent an occurrence of a coupled oscillation at the prism holder 12.

According to the present invention, since the center of gravity of the wedge-shaped prism supported by the prism holder in an transmission deflector using the prism is located on the principal axis about which the prism holder rotates, no oscillation due to the weight imbalance tends to occur. Consequently, the rotational force produced by the electromagnetic drive circuit can be effectively utilized to carry out precise and high-speed deflection.

What is claimed is:

1. A transmission type optical deflector, comprising:
   a prism holder supported by a yoke member to rotate about a principal axis through an elastic member;
   a wedge-shaped transmission prism provided on said prism holder to transmit and refract light; wherein
   said prism holder and yoke member are provided with a coil and a permanent magnet secured thereto, respectively, to produce a rotational motion of the prism holder in the forward and reverse directions about the principal axis due to an electromagnetic function; and wherein
   said transmission prism is partly cut away at the thicker portion thereof, with a center of gravity of said transmission prism coincident with the principal axis in a section in which the principal axis appears as a point and said transmission prism appears as a wedge shape.

2. A transmission type optical deflector according to claim 1, wherein said prism holder includes a cylindrical ring portion, and said transmission prism is a truncated circle in a front elevational view, with a part of a circular shape of the transmission prism cut away, and a circular portion of the perimeter of the transmission prism is supported by the cylindrical ring portion of said prism holder.

3. A transmission type optical deflector according to claim 1, wherein said prism holder is provided with said coils secured thereto, said coils being a pair of independent coils, which are placed on opposite sides of a plane including the principal axis and perpendicular to the center axis of said coils, and said yoke member is provided with front and rear permanent magnets secured thereto, each having a pair of split segments corresponding to a pair of said coils, said permanent magnets being placed on opposite sides of said plane including the principal axis and perpendicular to the center axis of said coils, the polarities of the permanent magnet segments being opposite, so that when the prism holder is driven, electric current passes in the pair of said coils in opposite directions.

4. A transmission type optical deflector, comprising:
   a yoke member;
   a prism holder that is supported by said yoke member to rotate about a principal axis via an elastic member;
   a wedge-shaped transmission prism provided on said prism holder to transmit and refract light, said transmission prism being partly cut away at the thicker portion thereof, with a center of gravity of said transmission prism shifted to be coincident with the principal axis in a section in which the principal axis appears as a point; and
   a coil and a permanent magnet provided with said prism holder and yoke member, respectively, to produce a rotational motion of the prism holder in the forward and reverse directions about the principal axis due to an electromagnetic function.

5. A transmission type optical deflector according to claim 4, wherein said transmission prism is formed as a truncated circular wedge, said transmission prism being truncated from a full circular wedge to shift said center of gravity to a position coincident with the axis of rotation and being non-circular in a front elevational view in which a part of a circular shape of the prism is cut away.

6. A transmission type optical deflector according to claim 4, wherein said prism holder is provided with said coils secured thereto, said coils being a pair of independent coils, which are placed on opposite sides of a plane including the principal axis and perpendicular to the center axis of said coils.

7. A transmission type optical deflector according to claim 6, wherein said yoke member further comprises front and rear permanent magnets secured thereto, each having a pair of split segments corresponding to a pair of said coils, said permanent magnets being placed on opposite sides of said plane including the principal axis and perpendicular to the center axis of said coils, the polarities of said permanent magnet segments being opposite, so that when the prism holder is driven, electric current passes through the pair of coils in opposite directions.

* * * * *